United States Patent
Bullivant

[15] 3,679,010
[45] July 25, 1972

[54] DIGITALLY CONTROLLED MASS FLOW FEEDER AND WEIGHT INTEGRATOR

[72] Inventor: Kenneth W. Bullivant, Glassboro, N.J.
[73] Assignee: K-Tron Corporation, Glassboro, N.J.
[22] Filed: Aug. 10, 1970
[21] Appl. No.: 62,397

[52] U.S. Cl. .......................... 177/16, 177/1, 177/121, 177/164, 177/210, 177/DIG. 3, 222/55, 198/39
[51] Int. Cl. ................ B65g 69/00, G01g 11/04, G01g 11/14
[58] Field of Search ............. 222/55, 63; 198/39; 177/16, 177/121, 164, 210, 119, 120, 50, 211, DIG. 3, 1

[56] References Cited

UNITED STATES PATENTS

| | | |
|---|---|---|
| 3,247,916 | 4/1966 | Chilton .......................... 177/210 X |
| 3,254,728 | 6/1966 | Aquadro et al. ................. 177/70 X |
| 3,390,731 | 7/1968 | Schierbeek ...................... 177/210 X |
| 3,559,451 | 2/1971 | Hyer et al. ....................... 177/16 X |
| 3,576,224 | 4/1971 | Susor .............................. 177/DIG. 1 |
| 3,610,908 | 10/1971 | Karosas .......................... 177/16 |
| 3,430,751 | 3/1969 | Bateson .......................... 198/39 X |
| 3,494,507 | 2/1970 | Ricciardi ......................... 198/39 X |
| 3,528,586 | 9/1970 | Stein et al. ...................... 222/55 |
| 3,561,643 | 2/1971 | Mloven ........................... 222/55 |
| 3,464,508 | 9/1969 | Engle et al. ..................... 177/210 |

Primary Examiner—Robert S. Ward, Jr.
Attorney—Seidel, Gonda and Goldhammer

[57] ABSTRACT

The speed of a conveyor belt is digitally controlled using a stepping or pulse motor drive for the belt so that belt speed corresponds to a preset mass flow value.

14 Claims, 4 Drawing Figures

Patented July 25, 1972 3,679,010
2 Sheets-Sheet 1
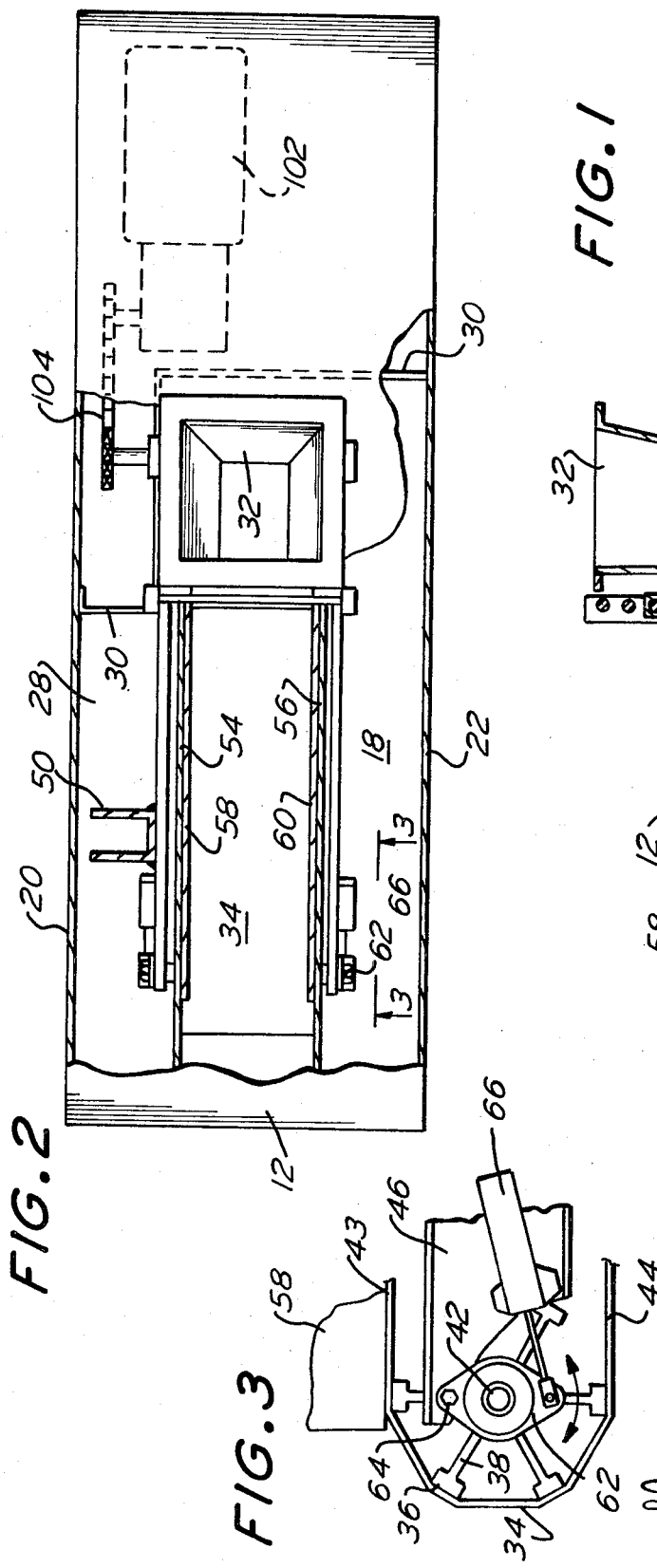
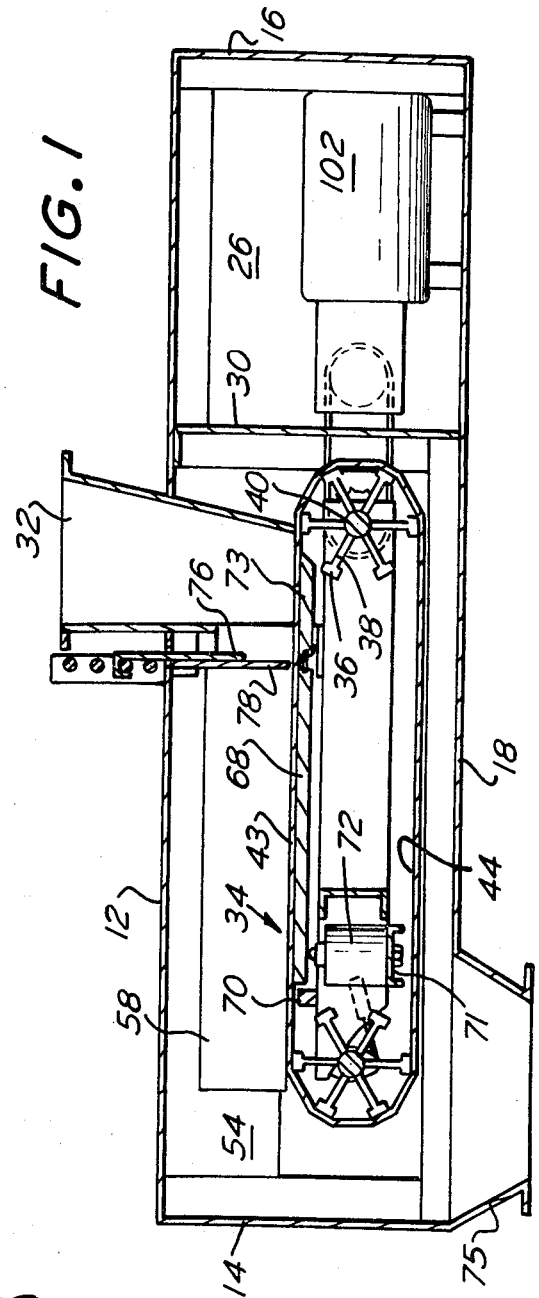
INVENTOR
KENNETH W. BULLIVANT
BY
Seidel, Gonda & Goldhammer
ATTORNEYS.

DIGITALLY CONTROLLED MASS FLOW FEEDER AND WEIGHT INTEGRATOR

Heretofore, feeders have been of the analog type wherein belt speed is multiplied by load and compared with a set mass flow; e.g., pounds per hour. Belt speed is increased or decreased to match the present flow. The mass flow set point and the signal compared therewith representing the rate of flow are voltage signals.

Analog mass flow control systems require calibration and are not computer compatible. A digital mass flow control system never needs calibration, has greater accuracy, and is computer compatible so as to be coupled to a printer or blender. In a digital control system, all signals are either on or off as opposed to a voltage signal which is only as accurate as the meters detecting the same. Analog systems involve a feedback concept wherein a comparison is made and a corrective action taken. In a digital control system, there is a continuous measuring of the load and a continuous computation of the speed required, thereby eliminating control system turning and hunting as well as any feedback signal.

The digitally controlled mass flow feeder of the present invention, which for purposes of disclosure is presented in the form of a gravimetric feeder, continuously measures the load and computes the required speed for the conveyor belt.

In accordance with the present invention the rate of change of belt travel ($dx/dt$) is determined by dividing mass flow ($dm/dt$) by belt weight loading ($w$). This is best understood by considering the formula for mass flow as shown below:

$$dm/dt = W\, dx/dt$$

By rearranging:

$$dx/dt = \frac{dm/dt}{W}$$

The desired mass flow rate can be preset and belt loading is measured as explained hereinafter. Therefore, appropriate control circuitry is provided to determine the required belt speed $dx/dt$ by computing the quotient $dm/dt$ divided by W.

In effectuating the aforesaid concepts, the load on a conveyor belt is continuously measured and a digital signal representative of such load is generated. This digital signal is compared with a digital signal representative of the mass rate in an appropriate digital comparator. By appropriate inversion in transformation of the digital signals, the result is a pulse whose frequency determines belt speed ($dx/dt$).

The present invention incorporates a clock frequency which is multiplied by a setpoint value to generate the digital signal proportional to the desired mass flow rate. The advantage of using he clock frequency is that a plurality of set points for different feed mechanisms can be controlled. Thus, the clock frequency can be changed to provide a proportional change for a number of feed devices.

It is an object of the present invention to provide a digitally controlled mass flow feeder.

It is another object of the present invention to provide a mass flow feeder which is more accurate and does not require calibration or feedback signals.

It is another object of the present invention to provide a mass flow feeder which is computer compatible so that it may be coupled to other machines such as printers or blenders.

It is another object of the present invention to provide a mass flow feeder wherein a load on a conveyor is continuously measured and the required speed of the conveyor is continuously computed, thereby eliminating control system turning and/or hunting.

Other objects will appear hereinafter.

For the purpose of illustrating the invention, there are shown in the drawings forms which are presently preferred; it being understood, however, that this invention is not limited to the precise arrangements and instrumentalities shown.

FIG. 1 is a longitudinal sectional view of a gravimetric feeder incorporating the present invention.

FIG. 2 is a plan view of the feeder shown in FIG. 1 with portions broken away for purposes of illustration.

FIG. 3 is a sectional view taken along the line 3—3 in FIG. 2.

Figure 4:
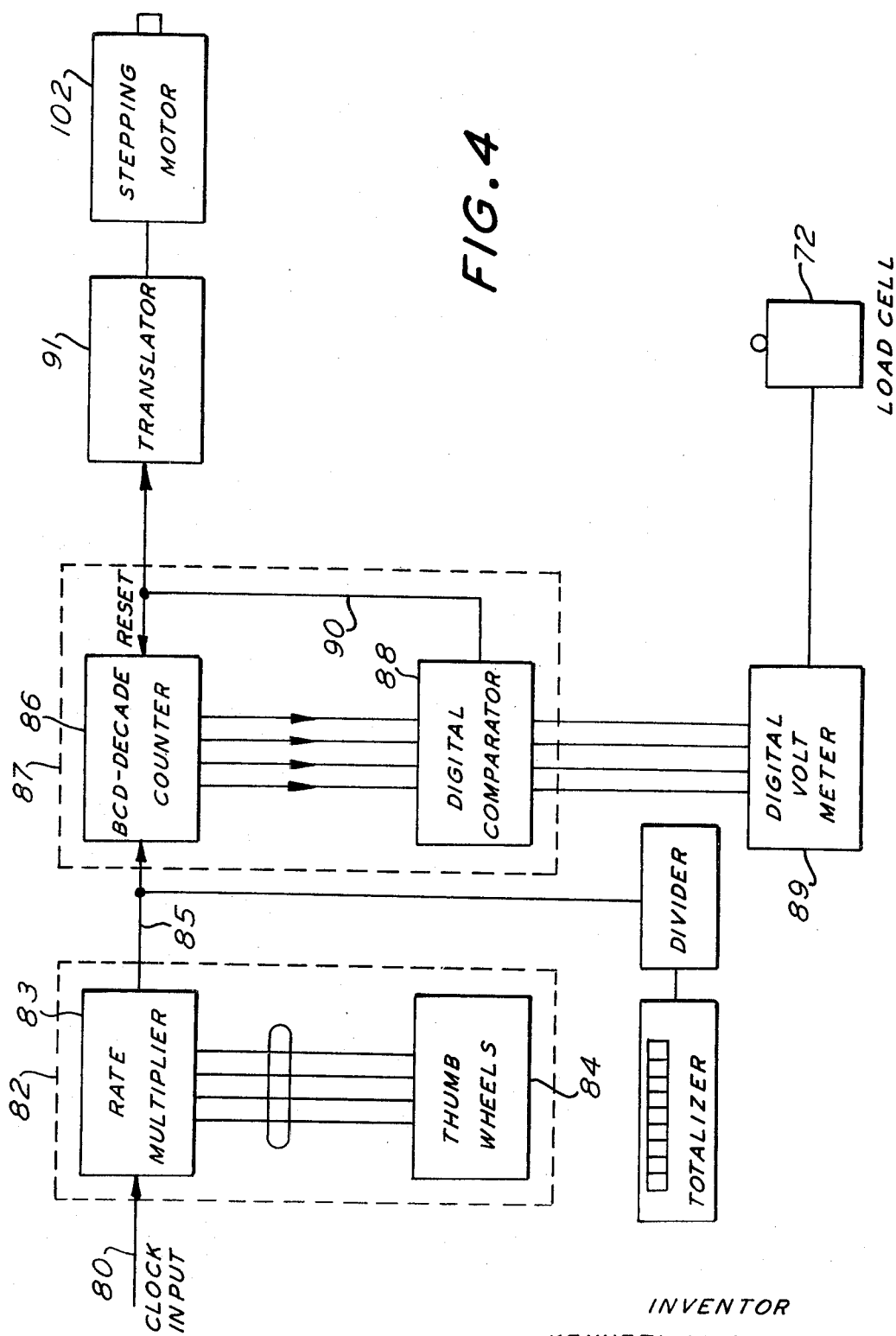
FIG. 4 is a diagrammatic illustration of the control circuit.

Referring to the drawing in detail, wherein like numerals indicate like elements, there is shown in FIG. 1 a typical gravimetric feeder incorporating the present invention and designated generally as 10. The feeder 10 includes a housing having a top wall 12, end walls 14 and 16, a bottom wall 18, and removable side walls 20 and 22.

The interior of the housing is divided into a motor chamber 26 and a belt chamber 28 separated by a dust-type partition 30. Dry granular materials may be introduced into the housing by way of an inlet hopper 32. Hopper 32 is bottomless and permits the dry granular material to fall directly onto endless belt 34. Belt 34 extends around roller means lacking a continuous surface.

Thus, the roller means for the belt 34 includes arcuate segments 36 at the end of spokes 38. The roller means includes a first driven hub 30 and a second idling hub 42. The driven hub 40 is below the hopper 32. Belt 34 includes a top run 43 and a bottom run 44.

The hubs 40 and 42 may be supported by a frame including channel or angle irons. The frame is supported only from partition 30 of the housing and a plurality of vertical columns 50, see FIG. 2. As shown more clearly in FIG. 2, panels 54 and 56 are supported by partition 30 and walls 14, 16. A material guide 50 is adjustably supported by panel 54. A similar guide 60 is adjustably supported by panel 56. The guides 58 and 60 have their lower edge close to the upper surface of belt 34 and prevent granular material from falling off the side edges of the belt.

As shown more clearly in FIG. 3, the hub 42 is supported at its ends by supports 62. Each support 62 is pivotally supported by one of said angle irons adjacent their upper ends for rotation about pin 64. See FIG. 3 wherein one of the angle irons is identified by the numeral 46.

An adjustable spring tensioner 66 is provided on opposite sides of the frame. Each tensioner 66 is supported by the adjacent one of the angle irons such as angle iron 46. The tensioners 66 are connected to one end of the supports 62. The tensioners 66 facilitate adjusting the tension of the belt 34 and the tracking of the belt 34.

The top run of the belt 34 is supported by a weighing table which includes a plate 68 pivotally supported at its righthand end in FIG. 1 by a pair of flexible leaf springs connected to a support plate 73. Support plate 73 is provided beneath the top run of the belt 34 immediately below the hopper 32. The ends of plate 73 are supported from the frame. The frame portions may be interconnected by a cross bar 70.

The lefthand end of the plate 68 is supported by an electronic weight transmitter 72. Electronic weight transmitter 72 is preferably a load cell such as Type TB–04 manufactured by Testing Technology Corporation. Transmitter 72 is supported by a cross brace 71 and adjustable from the frame so that the transmitter may be moved toward and away from the free end of the plate 68. Other load cells such as an electronic strain gauge load cell may be used in place of transmitter 72.

The granular material in hopper 32 is prevented from being delivered to the outlet hopper 75 by the belt 34 due to a valve member 74 and a plate 76. The valve member 74 is an imperforate sliding gate valve member. Plate 76 is provided with a rectangular opening 78. Plate 76 is stationary and replaceable when a different sized opening 78 is desired. Valve member 74 is manually adjustable in a vertical direction.

A stepping or pulse motor drive 102 is mounted within chamber 26. Motor drive 102 may be any one of a wide variety of commercially available stepping or pulse motors. Motor drive 102 is coupled to the hub 40 by means of sprockets and chain 104.

In FIG. 4, there is illustrated diagrammatically the control circuit whereby signals reflecting the weight of granular material on belt 34 as continuously detected by transmitter 72 are utilized to continuously cause motor drive 102 to drive belt 34 at the desired speed.

An input signal 80 is fed to a multiplier means 82. The input signal 80 is preferably a constant clock frequency from a clock device such as a crystal oscillator and constitutes a reference signal. A multiplier means 82 includes a rate multiplier 83 connected by a plurality of conductors to a thumb wheel switch setting device 84. Rate multiplier 83 is preferably based on a 1–2–4–8 BCD binary-coded decimal counter. Device 84 could be a punch card, or equivalent device as an input reference only.

The multiplier means 82 multiplies the clock frequency by the setting on device 82 so as to transmit or block pulses from the input signal 80, thereby providing as an output the set point frequency on line 85. This frequency corresponds to the mass flow rate ($dm/dt$). Stated otherwise, each pulse on line 85 is equal to a desired amount of flow of granular material on belt 34. The frequency signal of line 85 is fed into a multidecade BCD counter 86 forming a part of a frequency divider 87. The frequency divider 87 includes a digital comparator 88.

The analog signal frOm the transmitter 72 is coupled to a digital voltmeter 89 which converts the analog weight signal to a digital readout coupled to the comparator 88.

The frequency divider 87 divides the set point frequency on line 85 in digital language by the digital weight signal and provides an output signal 90 in the form of pulses to be transmitted to the motor drive 102. The output signal 90 also resets the decade counter 86.

The frequency divider 87 functions as follows. The pulse output from the rate multiplier 83 is fed to the binary-coded decimal (BCD) decade counter 86. The binary-coded output of the decade counter 86 is fed to the conventional digital comparator 88. Comparator 88 compares the counter value with the digital signal from voltmeter 89.

When the counter value exactly corresponds to the digital voltmeter value, the comparator output changes in the conventional manner, thus placing a signal on line 90. This signal on line 90 may be referred to as an initiating pulse. The initiating pulse is fed back to the counter 86 as shown and resets the counter to its start position. Stated otherwise, when comparator equality is reached, the counter 86 is cleared to zero. Simultaneously with the generation of the initiating pulse, digital comparator 88 returns to its original state, thereby terminating the initiating pulse. For each cycle, the counter 86 will count up to the value indicated by the digital voltmeter 89, and then repeat the cycle.

The initiating pulses on line 90 are also conducted to the translator 91. These pulses occur at a frequency that is inversely proportional to the digital voltmeter reading. Accordingly, the stepping motor 102 is driven at a rate equal to the initiating pulse frequency. This pulse frequency, as should be apparent from the previous explanation is directly proportional to the preset pulse frequency on line 85 and inversely proportional to the value generated by digital voltmeter 89. Thus, the formula $dm/dt/W$ is solved.

Since the pulse frequency applied to frequency divider 87 is a function of the product of the preset value generated by thumb wheel switches 84 and the clock input 80, several feeders may have a common feed rate control by use of the master clock signal for all set points. Thus, when the master clock frequency is changed, all set point average frequencies respond proportionately. Using this concept, proportional blending of several streams of material can be readily achieved.

If desired, the set point pulse frequency of line 85 may be coupled to a fixed frequency divider 104 which divides it down to a proportional lower frequency. The output of divider 104 is coupled to an electromechanical set point totalizer 106. Totalizer 106 registers the amOunt of material fed over a period of time and thus represents depletion from the storage hopper supplying material to the feeder 10.

Thus, it will be seen that the present invention contemplates continuously measuring the load and computing the speed required for the motor drive which is in the form of a pulse signal directly proportional to load. Thus, a pulse signal of 100 pulses per second transmitted to the translator 91 could be indicative of each pulse representing one pound per hour or one pound per minute as the rate of flow for the granular material. Thus, feedback of signals and taking of correction action utilized heretofore is eliminated.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a conveyor having a motor drive, means for feeding flowable solid material onto the conveyor, means for weighing said material on the conveyor and producing a digital output signal in response thereto, and digital control means connected to the motor drive, said digital control means producing an output pulse signal in response to an input frequency rate signal and said digital output signal of said weighing means, said output pulse signal causing the motor drive to operate the conveyor at a speed such as to cause the material mass flow to correspond to a preset value.

2. Apparatus in accordance with claim 1 wherein said motor drive includes a stepping motor.

3. Apparatus in accordance with claim 1 wherein said weighing means continuously weighs the flowable material on the conveyor and continuously transmits a digital signal indicative of desired speed to the motor drive.

4. Apparatus in accordance with claim 1 wherein said digital control means includes a multiplier means, said multiplier means multiplying said input frequency rate signal by a predetermined number.

5. Apparatus in accordance with claim 1 wherein said digital control means includes a frequency divider having a resettable counter coupled to a comparator, said comparator comparing the count of said counter with the digital output signal of said weighing means and producing said output pulse of said digital control means in response to detection of a predetermined relationship between the count of said counter and said digital output signal.

6. A method of controlling a mass flow feeder comprising the steps of continuously weighing a load on a conveyor, generating a signal representative of the load on the conveyor, converting the load signal to a first digital signal, producing a second digital signal from an input frequency pulse rate signal, comparing said first digital signal with said second digital signal and generating an output signal, and operating the conveyor drive in response to said output signal.

7. A method in accordance with claim 6 wherein said step of producing a second digital signal includes the step of multiplying an input frequency pulse rate signal in a binary rate multiplier by a set point rate signal indicative of the desired mass flow rate.

8. A method in accordance with claim 6 wherein said operating step includes a step of feeding said output signal to a stepping motor drive for driving the conveyor.

9. A digitally controlled mass flow feeder comprising a conveyor belt having a motor drive, means for continuously weighing a portion of the belt and any load thereon and generating a first digital signal in response thereto, and comparison means for directly controlling the speed of said motor drive as a function of a comparison of said first digital signal representative of the load and a second digital signal derived from a frequency pulse rate input signal.

10. Apparatus in accordance with claim 9 wherein said motor drive is a pulse stepping motor, and said comparison meanS including a frequency divider for dividing said frequency pulse rate input signal by said first digital signal.

11. A digitally controlled mass flow feeder in accordance with claim 9 wherein means are provided to produce said frequency pulse rate input signal, said means comprising a constant frequency pulse rate signal source and a binary rate multiplier for multiplying the output of said constant frequency pulse rate source by a set point value.

12. Apparatus in accordance with claim 9 including means for registering the total amount of material processed by the belt over a period of time.

13. Digital flow control apparatus, comprising: a conveyor having a motor drive; means for feeding flowable solid material onto said conveyer; means for receiving a pulse rate signal; means for multiplying said pulse rate signal by a predetermined number; means for counting the output of said multiplier means; means for weighting the material on said conveyor, said weighing means producing a digital signal output; comparator means, said comparator means comparing the output of said counting means and said weighing means and producing an output pulse when said output of said counting means equals the output of said weighing means; said motor drive of said conveyor receiving and being responsive to said output pulse of said comparator means.

14. Digital flow control apparatus as recited in claim 13 including means for resetting said counter in response to said output pulse of said comparator means.

* * * * *